(12) United States Patent
Shore

(10) Patent No.: US 6,808,180 B2
(45) Date of Patent: Oct. 26, 2004

(54) BRUSH SEAL

(75) Inventor: Karl W Shore, Birmingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/358,892

(22) Filed: Feb. 6, 2003

(65) Prior Publication Data
US 2003/0151207 A1 Aug. 14, 2003

(30) Foreign Application Priority Data
Feb. 14, 2002 (GB) .............................................. 0203492

(51) Int. Cl.⁷ .............................................. F16J 15/44
(52) U.S. Cl. ..................................................... 277/355
(58) Field of Search ........................................ 277/355

(56) References Cited
U.S. PATENT DOCUMENTS 5,941,685 A    8/1999  Bagepalli
6,059,526 A    5/2000  Mayr
6,161,836 A  * 12/2000  Zhou ........................... 277/355
6,173,962 B1 *  1/2001  Morrison et al. ............ 277/355
6,644,667 B2 * 11/2003  Grondahl ..................... 277/355
2001/0030397 A1 10/2001  Beichl

FOREIGN PATENT DOCUMENTS

EP    778431 A    6/1997
EP    1203906 A   5/2002

* cited by examiner

Primary Examiner—Alison Pickard
Assistant Examiner—Enoch Peavey
(74) Attorney, Agent, or Firm—W. Warren Taltavull; Manelli, Denison & Selter PLLC

(57) ABSTRACT

A brush seal for sealing between a rotor and a stator of a gas turbine engine includes a housing and a plurality of flexible bristles held within the housing. The bristles protrude from the housing so that a free end of each bristle is able to contact and seal against a seal surface of the rotor. The brush seal further includes a stop member for limiting movement of the free ends of the bristles towards the seal surface of the rotor, in order to reduce wear on the bristles.

16 Claims, 1 Drawing Sheet

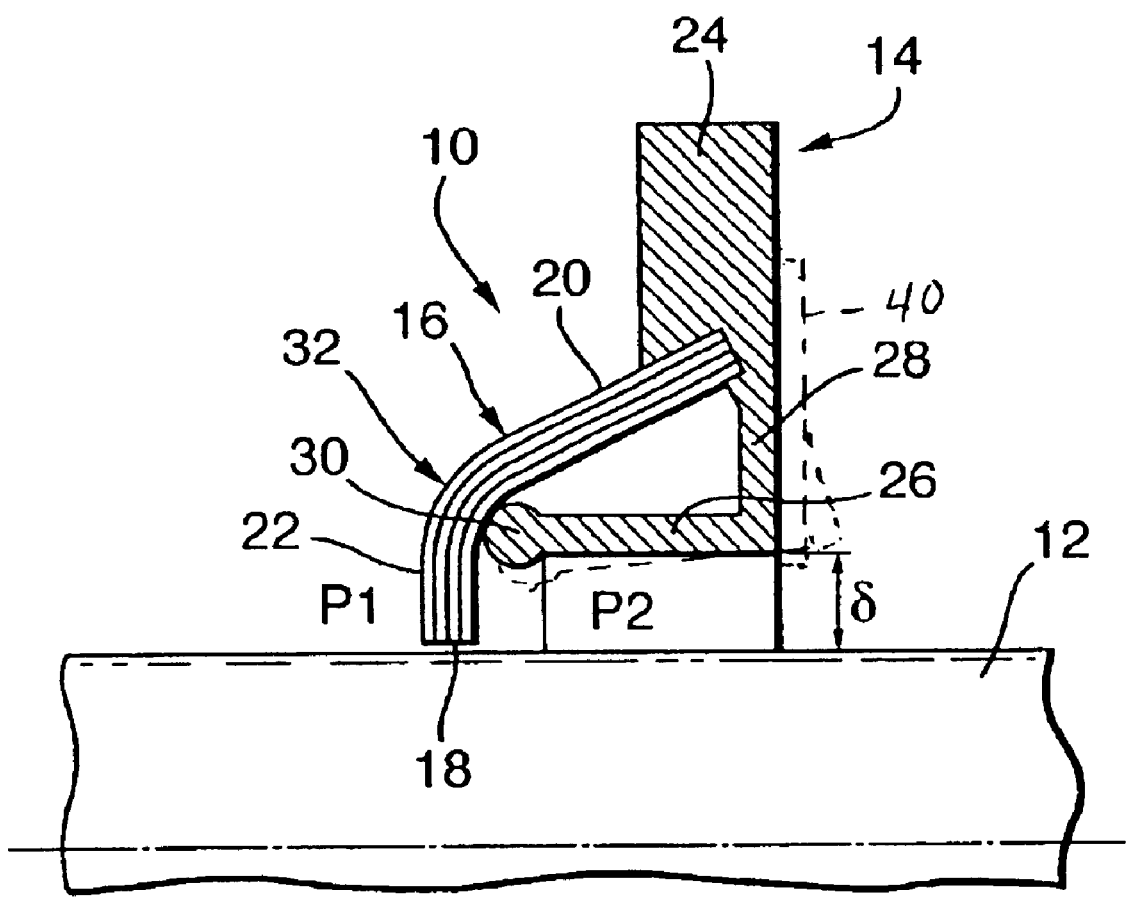

BRUSH SEAL

FIELD OF THE INVENTION

The invention relates to a brush seal for use in a gas turbine engine.

BACKGROUND OF THE INVENTION

Brush seals are used to seal shafts and other rotating components of gas turbine engines. Such seals generally include a bundle of densely packed bristles sandwiched between two plates. The bristles typically extend from a stationary housing, with free ends of the bristles wiping against a surface of the shaft or other rotating component to provide a seal thereagainst.

It is desirable that the bristles of the brush seal are relatively flexible, so that they may move radially to accommodate shaft excursions. Therefore, the bristles are usually mounted such that they are oriented at an angle to the radial direction of the rotating component. This allows the bristle to deflect radially outwardly if the rotating component expands or perhaps rotates unevenly. However, a problem with the bristles lying at an angle to the radial direction is that aerodynamic forces tend to force the bristles inwardly against the rotating component (this being termed "aerodynamic blow-down"). The greater the angle of the bristles to the radial direction, the stronger the inward force. Because the bristles are forced against the rotating component, this causes wear of the bristles.

The general trend in development of brush seals is to have the seals aligned close to the radial direction of the rotating component, this resulting in bristles which are stiffer against expansion or uneven rotation of the rotating component but which are less subject to aerodynamic blow-down. This causes rapid wear during excursions/growth of the rotating component.

SUMMARY OF THE INVENTION

According to the invention there is provided a brush seal for sealing between first and second components of a gas turbine engine, the brush seal including a housing and a plurality of flexible bristles held within the housing so as to protrude therefrom, a free end of each bristle being adapted to contact and seal against a seal surface of the first component; characterised in that the brush seal further includes a stop member for limiting movement of the free ends of the bristles towards the seal surface of the first component.

Preferably the stop member includes means for varying its distance from a part of the housing which holds the bristles. Preferably the stop member includes means for varying this distance in dependence upon the temperature of the stop member. The stop member may include means for inducing a part of the stop member to bend by varying amounts depending upon its temperature. The stop member may include a bi-metallic strip.

Preferably the first component is a rotor and the second component is a stator. Preferably the housing includes a generally annular member which surrounds a generally cylindrical part of the rotor and is spaced therefrom. Preferably the free ends of the bristles are adapted to seal against an outer surface of the rotor.

The stop member may be mounted on or formed as part of the housing, the stop member being located radially inwardly of the part of the housing which holds the bristles. The term 'radial' refers to the radial direction of the rotor.

The stop member includes a generally cylindrical member which may be connected to the housing by a generally radial member. The stop member may include a support ring located at a distal edge of the generally cylindrical member, the support ring being in contact with the bristles. The support ring may exert a radially outward force on the bristles and the magnitude of the force may vary depending upon the temperature of the stop member.

Each bristle may include a shaft portion and a seal portion, the shaft portion and the seal portion each being substantially straight but being angled to one another. An end of the shaft portion is preferably held within the housing and an end of the seal portion is preferably in contact with the seal surface of the first component. The stop member preferably contacts the bristle in a region where the shaft portion and the seal portion join. The angle between the shaft portion and the seal portion of each bristle may be between 110° and about 140°. The seal portion is preferably oriented substantially radially in relation to the rotor in use.

According to the invention there is further provided a gas turbine engine including a brush seal as defined in any of the preceding six paragraphs.

BRIEF DESCRIPTION OF THE DRAWINGS

An embodiment of the invention with be described for the purpose of illustration only with reference to the accompanying drawing which is a diagrammatic part sectional view of a brush seal arrangement according to the invention.

DETAILED DESCRIPTION OF THE INVENTION

Referring to the drawing, there is shown a brush seal assembly 10 which seals against a rotor 12, to separate spaces P1 and P2 of differing pressures.

The seal assembly 10 includes a generally annular seal housing 14 which surrounds and is spaced from the rotor 12. Mounted within the seal housing 14 are a plurality of densely packed elongate, flexible bristles 16. Distal ends 18 of the bristles 16 contact and seal against an outer circumferential seal surface of the rotor 12.

Each bristle 16 includes a generally straight shaft portion 20 and a generally straight seal portion 22. The seal portion of each bristle is oriented generally radially to the rotor and the shaft portion 20 is angled relative to the seal portion. The shaft portion lies at an angle of between 130° and 140° to the seal portion 22.

The seal housing 14 includes a main body 24 and an annular stop member 26 connected to the body 24 by a radial member 28. The annular stop member 26 is generally cylindrical and surrounds the rotor 12, but is spaced therefrom by a distance δ. The distance δ is typically between 0.5 mm and 3 mm. At a distal end of the stop member 26 there is provided a generally circular cross-section support ring 30.

The annular stop member 26 incorporates a bi-metallic strip 40 which causes the annular stop member to flex from the solid line position to the dotted line position in the drawing by a variable amount depending upon its temperature. This flexion causes the support ring t30 to move closer to or further away from the rotor 12, the support ring 30 moving farther away from the rotor 12 as it becomes hotter.

In normal use, a region 32 of the bristles where the shaft portion 20 and seal portion 22 merge contacts the support ring 30. Any radially inward forces acting on the bristles cause them to bear harder against the support ring 30 but do not cause the ends of the bristles to contact the rotor 12 more firmly. Thus, such radially inward forces do not cause increased bristle wear. In addition, as the bristles are predominantly radial in orientation, blow-down is much reduced. Thus, the bristles do not have to be stiffened to resist blow-down. The support ring 30 also acts as a stabiliser if turbulent conditions exist in the area.

The angled shaft portion 20 of the bristles allows them to flex outwardly should rotor excursions occur. In addition, the bi-metallic arrangement of the annular stop member 26 ensures that as the rotor 12 expands with increasing temperature, the bore diameter of the annular stop member 26 and support ring 30 is increased. This reduces bristle wear on expansion of the rotor 12.

The angle, length and diameter of the bristles can all be optimised to reduce loading on the bristles during rotor movement, although some radially inward bristle pre-load could be provided if required.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A brush seal for sealing between first and second components of a gas turbine engine, the brush seal including a housing and a plurality of flexible bristles held within the housing so as to protrude therefrom, a free end of each bristle being adapted to contact and seal against a seal surface of the first component, characterized in that the brush seal further includes a stop member for limiting movement of the free ends of the bristles towards the seal surface of the first component, wherein the stop member includes means for varying said distance in dependence upon the temperature of the stop member and wherein the stop member includes means for inducing a part of the stop member to bend by varying amounts depending upon its temperature.

2. A brush seal according to claim 1, wherein the stop member includes means for varying its radial distance from a part of the housing which holds the bristles.

3. A brush seal according to claim 1, wherein the first component is a rotor and the second component is a stator.

4. A brush seal according to claim 3, wherein the housing includes a generally annular member which surrounds a generally cylindrical part of the rotor and is spaced therefrom.

5. A brush seal according to claim 4, wherein the free ends of the bristles are adapted to seal against an outer surface of the rotor.

6. A brush seal according to claim 1, wherein the stop member is mounted on or formed as part of the housing, the stop member being located radially inwardly of the part of the housing which holds the bristles.

7. A brush seal according to claim 1, wherein the stop member includes a generally cylindrical member which is connected to the housing by a generally radial member.

8. A brush seal according to claim 7, wherein the stop member includes a support ring located at a distal edge of the generally cylindrical portion, the support ring being in contact with the bristles.

9. A brush seal according to claim 8, wherein the support ring exerts a radially outward force on bristles and the magnitude of the force upon the temperature of the stop member.

10. A gas turbine engine including a brush seal according to claim 1.

11. A brush seal, for sealing between first and second components of a gas turbine engine, the brush seal including a housing and a plurality of flexible bristles held within the housing so as to protrude therefrom, a free end of each bristle being adapted to contact and seal against a seal surface of the first component, characterized in that the brush seal further includes a stop member for limiting movement of the free ends of the bristles towards the seal surface of the first component wherein the stop member includes a generally cylindrical member which is connected to the housing by a generally radial member and wherein each bristle includes a shaft portion and a seal portion, the shaft portion and the seal portion each being straight but being angled to one another.

12. A brush seal according to preceding claim 11, wherein an end of the shaft portion is held within the housing and an end of the seal portion is in contact with the seal surface of the first component.

13. A brush seal according to claim 11, wherein the stop member contacts the bristles in a region where the shaft portion and the seal join.

14. A brush seal according to claim 11, wherein the angle between the shaft portion and the seal portion of each bristle between 110° and about 135°.

15. A brush seal according to claim 11, wherein the portion is oriented substantially radially in relation to the rotor in use.

16. A brush seal, for sealing between first and second components of a gas turbine engine, the brush seal including a housing and a plurality of flexible bristles held within the housing so as to protrude therefrom, a free end of each bristle being adapted to contact and seal against a seal surface of the first component, characterized in that the brush seal further includes a stop member for limiting movement of the free ends of the bristles towards the seal surface of the first component wherein the stop member includes a bi-metallic strip.

* * * * *